Sept. 15, 1959    R. B. HOUGHTON    2,904,732
CAPACITIVE PRESSURE TRANSDUCER
Filed June 20, 1956
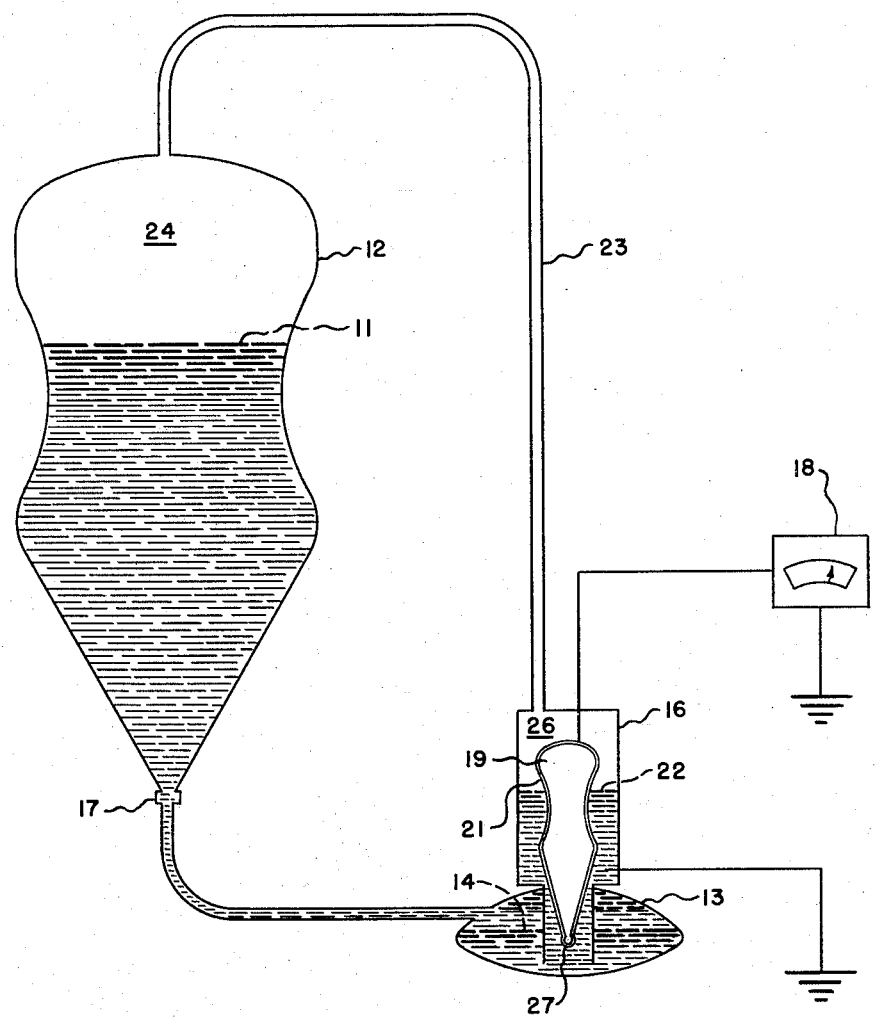
INVENTOR.
RICHARD B. HOUGHTON
BY
ATTORNEY.

United States Patent Office 2,904,732
Patented Sept. 15, 1959

2,904,732

CAPACITIVE PRESSURE TRANSDUCER

Richard B. Houghton, San Diego, Calif., assignor to General Dynamics Corporation, San Diego, Calif., a corporation of Delaware Application June 20, 1956, Serial No. 592,574

8 Claims. (Cl. 317—246)

This invention relates to capacitive pressure transducers and more particularly to transducers having a capacitive output indicative of fluid volume or weight in tanks of irregular shape through translation of pressure and capacitive analogue of tank shape.

In capacitance type fluid quantity gauges, measurement of fluid quantity is effected by means of a capacitor which usually comprises two spaced electrodes extending between the top and bottom of the fluid container and using the dielectric properties of the fluid to complete the variable capacitor. With a variable dielectric the measurement is not linear and calibration curves are required. These gauges are subject to serious error resulting from variations in fluid characteristics, requiring compensating devices to be used therewith. Gauges providing for direct fluid height measurements are necessarily bulky and indicate volume or total weight only when the container is of regular shape, i.e., the surface area of the fluid is constant at all levels. Otherwise the gauges are subjected to further error due to the irregular shape of the container. Non-linear scales for accurately reading volume or weight of fluids in tanks of any shape are difficult to read and otherwise undesirable. Gauges remotely spaced from the fluid tank and sensitive to fluid pressure heretofore could not be used in obtaining fluid measurement in pressurized tanks.

In the capacitor type fluid quantity gauge used to illustrate the principles of the present invention the above disadvantages are overcome through the provision of a gauge placed exteriorly of the fluid tank for converting the pressure exerted by the fluid into a variable area plate of a capacitor, varying the area of the other plate in conformance with the configuration of the irregular shaped container (with consideration given to the density of the fluid to be measured) and using a dielectric therebetween of a constant value. When internal tank pressure is added to fluid pressure it proportionally increases the area of the plate. This is corrected by exerting the internal pressure in opposition to the total pressure to obtain a plate area corresponding to the differential pressure or true fluid pressure. By replacing the second plate with one having an area proportional to its height, the pressure of fluids in a gaseous state also can be determined. By knowing the pressure and the volume of the container, the total weight of the gaseous fluid may also be read from the gauge.

It is therefore an object of this invention to provide for an improved capacitive pressure transducer.

Another object is the provision of a remote fluid quantity gauge for linearly measuring fluids in regular and irregular shaped containers.

Still another object is the provision of a capacitor type gauge wherein the dimension of one plate in one direction varies according to fluid pressure, the other plate provides a capacitive analogue of the container shape and the dielectric remains constant.

Another object is the provision of a fluid quantity gauge for accurately indicating total weight of fluid in liquid or gaseous state in any shaped container.

A further object is the provision of a capacitor type fluid quantity gauge remotely connected to a pressurized fluid tank for varying a capacitance in accordance with the difference between fluid pressure plus internal pressure and internal pressure to indicate total fluid weight or volume.

Other objects and features of the present invention will be readily apparent to those skilled in the art from the following specification and appended drawing having a single figure wherein is illustrated schematically the components of one preferred type and their relationship for purposes of depicting the principles of this invention.

Fluid 11 in tank 12 of any configuration connected to mercury reservoir 13 exerts a pressure forcing mercury 14 into the capacitance chamber 16 in an amount proportional to the fluid pressure. This pressure causes the mercury to rise in the chamber to a height which indicates the height of the column of fluid directly over opening 17. In a tank giving the fluid a uniform top surface area regardless of the fluid height, this pressure may also be indicative of total volume or weight, depending upon the calibration of the capacitance readout gauge 18.

A metallic rod 19 coated with a dielectric material 21 such as any of the fluorocarbon family, for example, is positioned within the capacitance chamber 16. This rod is shaped to provide the analog of the shape of fuel tank 12. For example, the circumference of the rod 19 for any height of mercury is proportional to the top surface area of the fluid in tank 12 at its corresponding fluid level height. This rod is electrically connected to readout gauge 18 which is calibrated to read capacitance in terms of total fuel volume or weight, as desired. The column of mercury 22, which varies in height in accordance with fluid pressure of fluid 11 and in surface area corresponding to the configuration of rod 19, serves as one variable area plate of a capacitor. The coating 21 on rod 19 serves as a uniform dielectric and the rod 19 forms the other plate of the capacitor. Since the rod surface area for any height of the mercury corresponds to the shape of the tank to its fluid level, the capacitance is converted from one indicative of height, or volume in a regular shaped tank, to volume or weight of fuel in an irregular shaped tank.

It should be noted that the configuration of rod 19 is determined in part by the density of the type of fluid in the tank. For example, a fluid of very light density may fill the tank for a given weight whereas a fluid of greater density may only partially fill the tank for a given weight. Thus, it becomes obvious that the configuration of the rod, and accordingly plate area, must be different under the two conditions to accurately convert the pressure due to fluid height into total fluid volume or weight as the case may be. Within these requirements it is believed that one skilled in the art, upon experimentation and proper calibration, can properly design rod 19 to obtain extremely high accuracy in gauge readout indication for any density of fluid and any shape of fuel tank.

In some instances, such as in fuel tanks of high flying aircraft, it is desirable to use pressurized fluid containers to keep the fluid under constant pressure. This maintains the fluid at its proper density, which gives greater fluid measurement accuracy, prevents fluid evaporation and has other desirable features. However, this pressure is also added to the fluid pressure and transmitted to the capacitor chamber 16 to cause the mercury to rise higher than otherwise, creating a plate area indicative of fluid pressure plus the internal tank pressure and a corresponding error in gauge readout. To prevent this error a pressure compensation tube 23 is used to connect the top of chamber 16 with the top of tank 12. Thus the internal pressure 24 in the tank 12 equals the internal pressure 26 in chamber 16 which is added to the pressure of the mercury column 22. In this manner the effect of internal pressure is neutralized and the mercury column 22 becomes a true indication of fluid height in the tank. This may be expressed mathematically wherein the pressure at opening 17 equals the pressure on the mercury at the lower tip 27 of the metallic rod 19. Thus, $$P_0 + D_1 L_1 = P_0 + D_2 L_2$$

where $P_0$ = internal pressure 24 and 26
$D_1$ = density of fluid 11 in tank 12
$L_1$ = height of fluid 11
$D_2$ = density of mercury
$L_2$ = height of mercury column 22 above the mercury level in reservoir 13

$P_0$, appearing on both sides of the equation, cancels leaving $D_1 L_1 = D_2 L_2$. Thus the internal pressure within the tank does not affect the height of the mercury column, plate area of the capacitor or output reading of the capacitance reading gauge 18.

Any electrically conducting liquid of low compressibility may be used as the variable plate. Mercury has been used and is preferred because of its density which permits the fabrication of a compact unit.

This gauge is equally useful in reading pressure or total weight of a gaseous fluid in tank 16. In this case there is no fluid level variation with change in fluid quantity and the pressure is independent of the shape of the container. Therefore, the rod 19 is not shaped in a manner indicative of the container shape but instead is cylindrically shaped to provide for a linear increase in plate area with rise in mercury. The gauge 18 may be calibrated to read gaseous fluid pressure or, by consideration of the volume of the tank, it may be calibrated to read total pounds of fluid.

In addition to being used as a pressure transducer for indicating pressure, volume or weight of fluid in a container, the capacitive pressure transducer may also be used in a barometer, pressure, vacuum and pressure differential gauges, altimeter, fuel and air ratio indicators and for rate of climb indication when used on aircraft. It may be used as a weight scale or weight control unit as well as for alarm signal devices. These uses are not meant to be all inclusive but merely suggestive of its many applications.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. In combination, a fluid container of any shape and a capacitive pressure transducer for providing an output indicative of fluid therein, said transducer including a variable capacitor comprising a capacitance chamber and a fluid reservoir, means for providing a linear change in capacitance with linear change in weight of fluid in said container, said means comprising an electrically conducting element in said chamber and an electrically conducting liquid in spaced proximity therewith, said liquid having a density greater than that of said fluid, connecting means between said container and said fluid reservoir whereby weight from said fluid exerts a pressure on said liquid, means communicating between said reservoir and said chamber to permit said liquid to flow therebetween in response to pressure from said weight, said liquid thereby having a density times height along said element in said chamber proportional to the density times height of said fluid in said container, said element having a horizontal length at said liquid height in said chamber proportional to the surface area of said fluid in said container, the relationship between said element length and said fluid surface area being the same for variable amounts of fluid in said container.

2. In combination, an irregularly shaped container and a variable capacitance fluid quantity gauge for externally measuring fluid present in said irregularly shaped container wherein there is a non-linear relationship between change in fluid level and change in fluid quantity, said gauge including a capacitor chamber containing a capacitor having one plate with a height smaller than and proportional to the height of said container and a surface area indicative of container volume, and a second plate spaced from said one plate by an insulating material of uniform dielectric constant, said second plate being variable in vertical length in proportion to said fluid level and having a surface area so related to the irregular shape of said container that the capacitance area of said plate is proportional to the quantity of fluid in said container.

3. In a capacitor as in claim 2 wherein said second plate has a horizontal distance at the top of said vertical length proportional to the top surface area of said fluid at any fluid level.

4. In combination, an irregularly shaped container and a capacitance type pressure transducer for externally measuring fluid quantity in said irregular shaped container including a capacitor having one plate whose height is proportional to the height of said container and whose horizontal periphery is proportional to the horizontal periphery of said container in all horizontal planes from base to top of said plate and container to thereby provide a surface area indicative of the shape of said container, a second plate surface area parallel to said one plate surface area, said surface areas being spaced by a material having a constant dielectric characteristic, and means for varying the dimension of said second plate surface area in a vertical direction in a manner indicative of pressure of said fluid, and means comprising a reservoir connected to the lowermost portion of said container to permit fluid flow therebetween, said second plate comprising an electrically conducting liquid of density heavier than said fluid, and means for varying the height of said liquid proportional to height of said fluid in said container.

5. In combination, a fluid container of any shape and a capacitance pressure transducer for providing an output indicative of fluid therein, said transducer including means for relating fluid pressure with total fluid volume of fluid in said container comprising a capacitance type pressure gauge including a capacitor having two electrically conducting plates with a dielectric material therebetween, said plates being shorter than the height of said container, one of said plates varying in height in proportion to the density times height of said fluid, said plates having a mutually adjacent peripheral distance at the height of said plate of variable height proportional to the surface area of said fluid at its height in said container, the peripheral height-surface area relationship remaining constant for all heights of said fluid.

6. In combination, a fluid container of any shape and a capacitance pressure transducer for providing an output indicative of fluid therein, said transducer including means for relating fluid pressure with total fluid weight of fluid in said container comprising a capacitance type pressure gauge including a capacitor having two electrically conducting plates with a dielectric material therebetween, one of said plates being of mercury and varying in height in proportion to the density times height of said fluid, said plates having a mutually adjacent peripheral distance at the height of said plate of variable height proportional to the surface area of said fluid at its height in said container, the peripheral height-surface area relationship remaining constant for all heights of said fluid.

7. In combination, a fluid container and a capacitor type pressure transducer for measuring fluid weight in a pressurized container comprising a capacitance chamber, a first plate whose surface area is the analogue of the shape of said container, a liquid plate spaced therefrom by an insulating material of uniform dielectric constant, said liquid plate having a density greater than that of said fluid, said liquid plate having a height dependent upon the density of the liquid comprising said plate and proportional to the height and density of fluid in said container, said liquid plate having a surface area adjacent said insulating material variable in proportion to fluid volume in said container, means for transmitting to said liquid plate the weight of a column of said fluid and internal pressure in said container for actuating said liquid plate in a vertical direction and means for transmitting said internal pressure of said container to said liquid plate for actuating said liquid plate in an opposing direction to thereby cancel the effect of internal pressure in establishing the height of said plate.

8. In combination, a fluid container and a capacitor pressure transducer for externally measuring total weight of a fluid in said container, said transducer including a capacitance chamber having a first plate whose surface area is the analogue of the shape of said container, a second plate whose surface area is parallel to the surface area of said first plate and whose dimension in one direction is variable with fluid pressure in said container, said plates having a dielectric material placed therebetween, said second plate comprising a non-compressible electrically conducting liquid in spaced proximity of said first plate, said liquid in said chamber having a density greater than that of said fluid and a height times density product equal to the height times density product of said fluid in said container.

References Cited in the file of this patent
UNITED STATES PATENTS

| | | |
|---|---|---|
| 2,354,945 | Cohen | Aug. 1, 1944 |
| 2,423,875 | Curtis | July 15, 1947 |
| 2,741,124 | Meyers | Apr. 10, 1956 |

FOREIGN PATENTS

| | | |
|---|---|---|
| 443,985 | Germany | Nov. 21, 1924 |
| 481,103 | Britain | Feb. 28, 1938 |
| 938,682 | France | Apr. 12, 1948 |
| 614,806 | Great Britain | Dec. 23, 1948 |